United States Patent [19]

Ulmer

[11] 4,246,691
[45] Jan. 27, 1981

[54] TRACTION DEVICE

[76] Inventor: Leroy A. Ulmer, 11993 Lockart Rd., Philadelphia, Pa. 19116

[21] Appl. No.: 59,542

[22] Filed: Jul. 23, 1979

[51] Int. Cl.³ .............................................. B60C 27/00
[52] U.S. Cl. .................... 29/526 R; 152/208; 301/44 T; 301/46; 301/49; 301/51
[58] Field of Search .................. 152/208, 216, 225 R; 180/15, 16; 267/73, 74; 301/41 R, 43, 44 R, 44 T, 45, 46, 51, 49; 29/428, 526 R; 280/152.05, 156

[56] References Cited

U.S. PATENT DOCUMENTS

| 2,443,406 | 6/1948 | Thompson | 152/225 R |
| 2,598,851 | 6/1952 | Spevak | 301/43 |
| 2,709,115 | 5/1955 | Nisser | 301/41 R |
| 3,045,738 | 7/1962 | Lombardi | 152/225 R |
| 3,117,612 | 1/1964 | Minutua | 152/216 |
| 3,132,682 | 5/1964 | Fox | 152/216 |
| 3,249,143 | 5/1966 | Scott | 152/225 R |
| 3,478,803 | 11/1969 | Sand | 152/225 R |
| 3,753,456 | 8/1973 | Saunders | 152/225 R |
| 3,911,985 | 10/1975 | Fletcher | 152/208 |
| 3,935,891 | 2/1976 | McCloud et al. | 152/225 R |
| 4,089,359 | 5/1978 | Jones | 152/216 |

Primary Examiner—John T. Goolkasian
Assistant Examiner—Robert A. Dawson
Attorney, Agent, or Firm—Harding, Earley & Follmer

[57] ABSTRACT

The traction device of the invention is for use with a vehicle wheel supported by lugs and having a tire. The traction device has a base with openings for the reception of at least two but less than all, the lugs for supporting the base. A plurality of spaced radial arms are supported by the base with each having an end adapted to extend beyond the outer periphery of the tire and protrude into an icy surface. Each of said ends is adapted to lie in a vertical plane adjacent to the outer side wall of the tire. The end of each arm may advantageously be free to move in and out while being spring biased outwardly, be threadably attached to the arm for movement inwardly and outwardly, or be pivotally connected to the arm for movement into and out of an operative position. The said ends may extend different distances beyond the outer periphery of the tire. Preferably, the base is secured on less than all of the lugs and has a bearing recess accommodating a nut on a lug to which the base is not secured.

12 Claims, 10 Drawing Figures

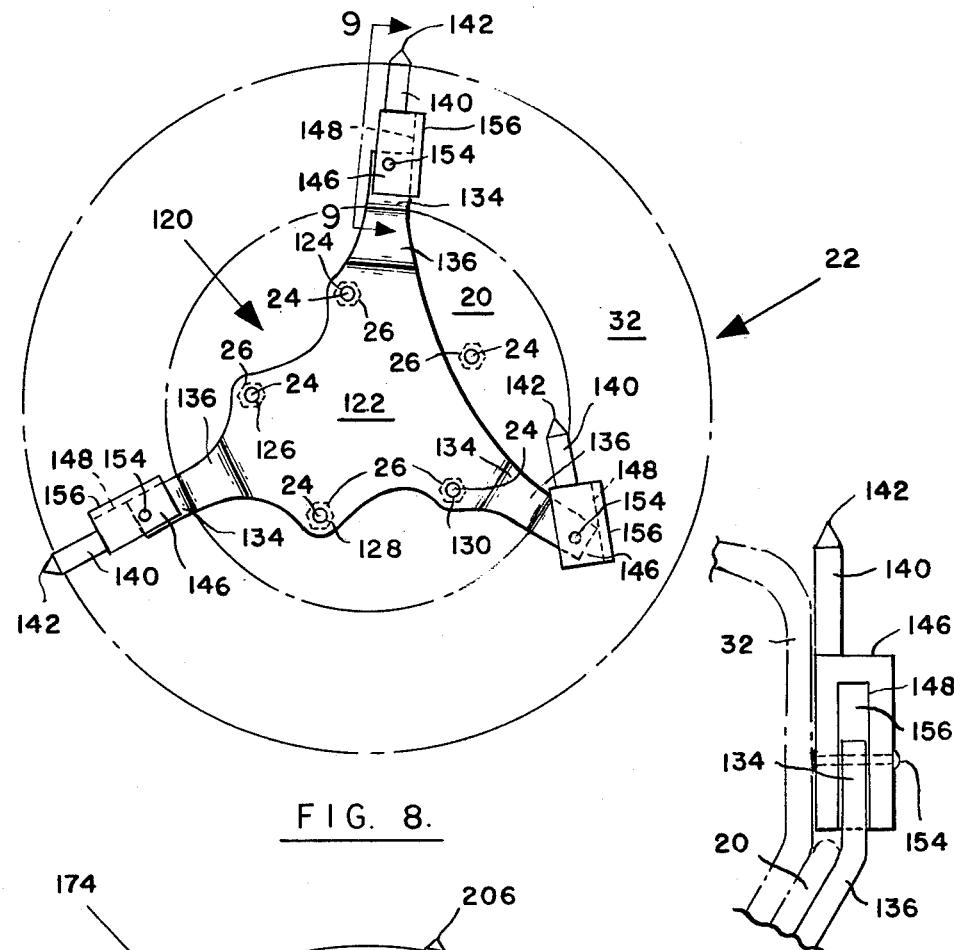
FIG. 8.
FIG. 9.
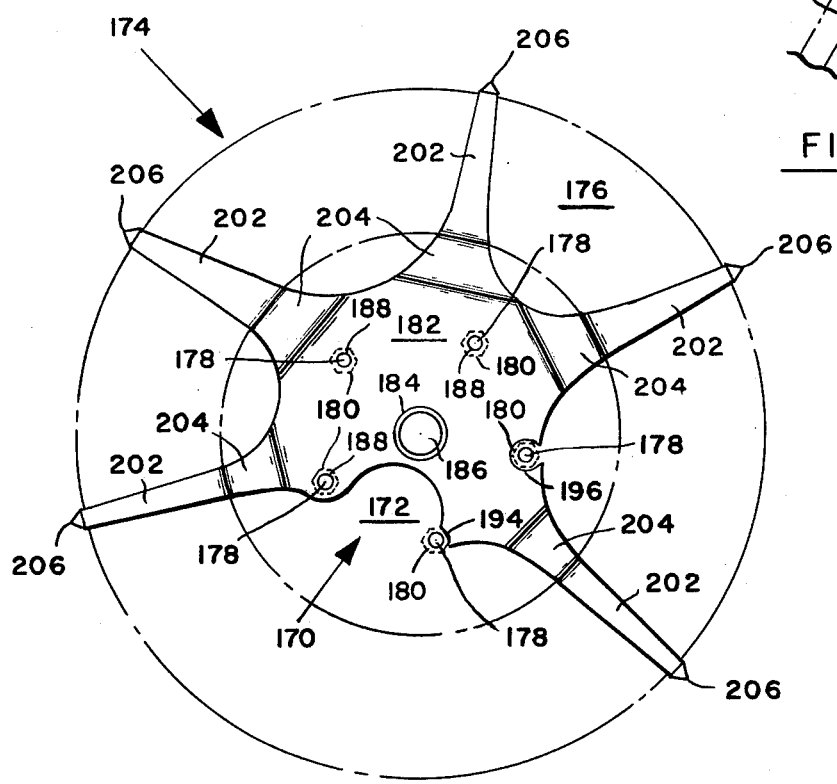
FIG. 10.

TRACTION DEVICE

TECHNICAL FIELD

This invention is in the field of traction devices for use with vehicle wheels especially to provide traction for the motor vehicle on ice.

BACKGROUND OF THE PRIOR ART

For most automobile owners, there exists a need in the winter for a traction device that will get their car, parked on ice from the curb or driveway, to the middle of the cleared street or to get their car to a main artery of traffic, where the snow and ice has been cleared. The traction device, therefore, should be one in which it is temporary in nature and one in which it is easy to put on and take off.

Snow chains are probably the best device for travelling on snow and ice in a region where there is continuous snow and cold weather. Snow chains, however, have many disadvantages. The first one of which is to predict the weather and time to get to the service station before the snow is too bad. Second, the chains are very cumbersome if you put them on yourself, with only the younger and more rugged bothering with them. Thirdly, they may only be needed on snow and ice for six blocks, but after that one may have six miles to travel on clear paved road. After once on, either of the options is not practical: to take them off is bothersome and to leave them on is bumpy riding.

The studded snow tires of the prior art are unsatisfactory since (1) they stay on for the entire winter during most of which they are unnecessary, (2) they tear up the roads, (3) the studs may tend to make a car slide on a concrete road during hard braking at high speed, and (4) they do not provide a smooth ride.

Other typical prior art traction devices are shown in U.S. Pat. Nos. 4,089,359; 3,935,891; 3,753,456; 3,478,803; 3,249,143; 3,117,612; 3,045,738; 3,132,682; 2,598,851; and 2,443,406. These prior art devices all have in common a cleat or the like parallel to the axis of the wheel and overlying the tire tread. They are either lacking in secure attachment to the wheel by wheel lugs as in the case of U.S. Pat. Nos. 3,249,143 and 3,478,803, or they are attached to the wheel using all of the lugs employed to secure the wheel to the vehicle. These prior art devices are necessarily complex structurally and hence expensive. They are difficult to install and remove.

The traction device of the invention is a simple inexpensive structure which eliminates cleats overlying the tire. The device of the invention is simple to install and remove. Despite the simplified structure of the device of the invention, it is, surprisingly, very effective in providing traction for a vehicle travelling on ice. It is out of contact at all times with the tread of the tire and hence avoids the possibility of it damaging the tread.

BRIEF SUMMARY OF THE INVENTION

The traction device of the invention is for use with a vehicle wheel supported by lugs and having a tire. As used herein, the term "lug" includes equivalent devices such as bolts. The traction device has a base, having openings for the reception of at least two lugs for supporting the base, but leaving at least one lug attaching the wheel to its base while mounting the traction device onto the wheel. A plurality of spaced radial arms are supported by the base, each having an end adapted to extend beyond the outer periphery of the tire and protrude into an icy surface. Each of said ends is adapted to lie in a vertical plane adjacent to the outer side wall of the tire. The end of each arm may advantageously be free to move in and out while being spring biased outwardly, be threadably attached to the arm for movement inwardly and outwardly, or be pivotally connected to the arm for movement into and out of an operative position. The said ends may extend different distances beyond the outer periphery of the tire. Preferably, the base is secured on less than all of the lugs and has a bearing recess accommodating a nut on a lug to which the base is not secured.

Mainly and simply, two to four of the five nuts on a driving wheel are removed from the lugs. The "Forice" traction device is then inserted onto the lugs and locked into place again by the nuts. Three (or more) equally divided metal extenders go beyond the tire circumference, digging into the ice, enabling the car to move over ice. Once on clear pavement, the two nuts are removed again, the traction device taken off and the nuts replaced.

BRIEF DESCRIPTION OF THE DRAWINGS

FIG. 8 is a side elevation of an alternative embodiment of the invention secured to a wheel;

FIG. 9 is a view of an end of an arm of the device of FIG. 8 taken on the plane indicated by the lines 9—9 of FIG. 8; and FIG. 10 is a side elevation of an alternative embodiment of the invention secured to a wheel.

DETAILED DESCRIPTION

Figure 1:
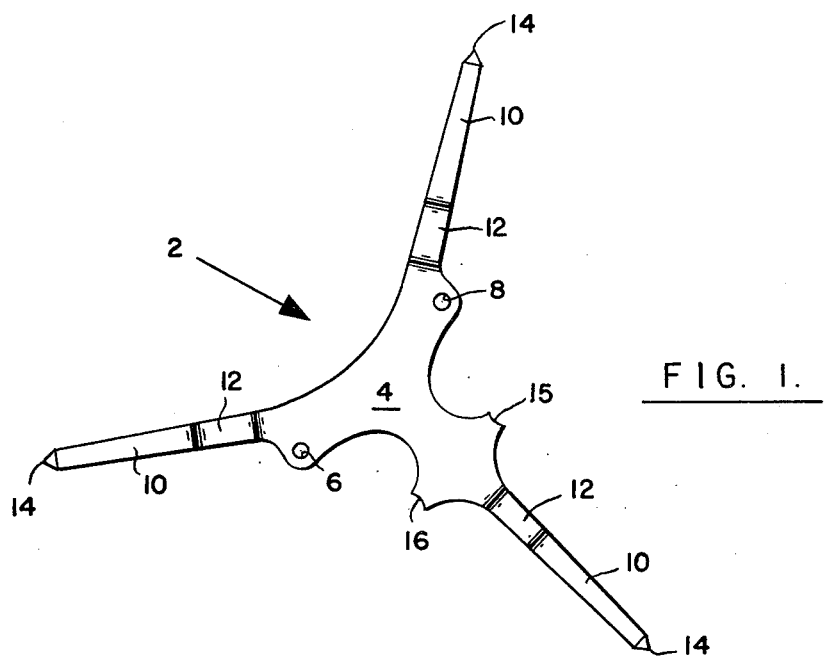
FIG. 1 is a side elevation of a traction device in accordance with the invention.

Referring to FIG. 1, a traction device 2 in accordance with the invention has a base 4 having openings 6 and 8 each adapted to receive a wheel lug. Integral with base 4 are three arms 10 each offset at 12 and each having a pointed end 14. Base 4 is provided with arcuate bearing portions 15 and 16 for cooperation with nuts on wheel lugs.

Figure 3:
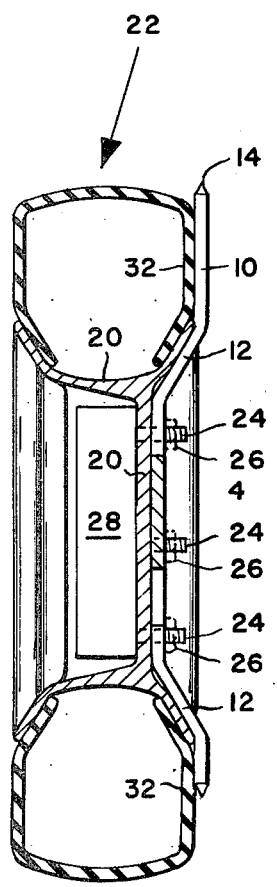
FIG. 3 is a vertical section taken on the plane indicated by the line 3—3 in FIG. 2.
Figure 2:
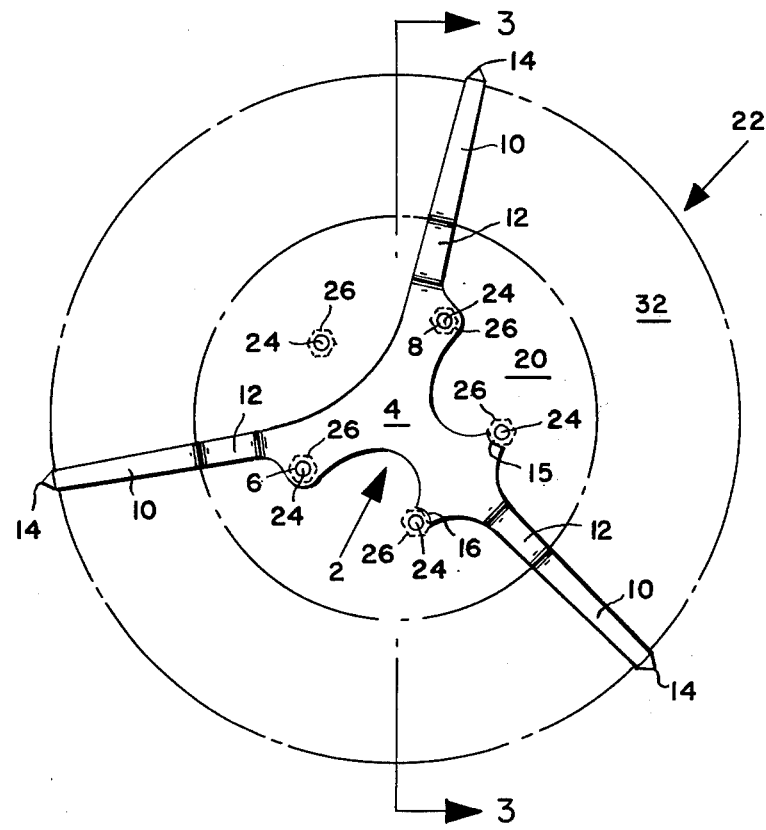
FIG. 2 is a side elevation of a wheel with the device of FIG. 1 secured thereto.

Referring now to FIG. 2, the traction device 2 is secured to a vehicle drive wheel 20 carrying a tire 22. Wheel 20 is mounted on lugs 24 each having a nut 26, with lugs 24 extending outwardly from a conventional wheel drum 28 (FIG. 3). One of the lugs 24 is received in opening 6 and another lug 24 is received in opening 8 for the support of base 4. Each of arcuate bearing portions 15 and 16 is closely adjacent a nut 26.

The outer portions of arms 10 lie in a plane adjacent the outer wall 32 of tire 22, and the pointed ends 14 extend beyond the outer periphery of the tire so as to penetrate an icy surface and provide traction as wheel 20 rotates. The ends 14 may extend the same or different distances beyond the outer periphery of the tire. In a typical case, they might all extend 7 millimeters beyond the outer periphery of the tire at rest. In another typical case, they might extend respectively, 3, 5 and 7 millimeters beyond the outer periphery of the tire at rest to give different penetrations of the icy surface. A device 2 is secured to each of two opposite drive wheels, one on the driver's side and one on the passenger's side.

The traction device 2 is simple in structure and low in cost. It can readily be made for example from steel plate. It is readily installed or removed by the manipulation of only two lug nuts. The arcuate bearing portions 15 and 16 are adapted to bear against the adjacent lug nuts 26 depending on direction of wheel rotation and, hence, provide base 4 with additional support. For example, if the wheel 20 is rotating clockwise as viewed in FIG. 2, arcuate portion 15 bears against adjacent nut 26 to support base 4 as it is urged clockwise. Arcuate portion 16 cooperates with the adjacent nut 26 to provide support when the wheel rotation is counterclockwise.

Figure 4:
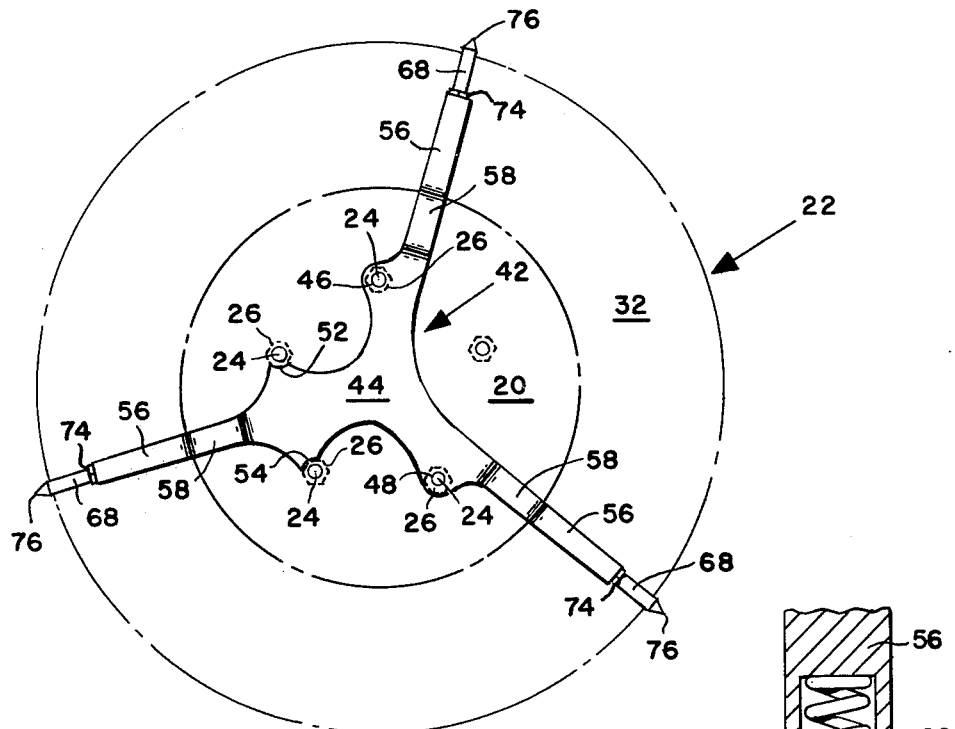
FIG. 4 is a side elevation of an alternative embodiment of the invention.
Figure 6:
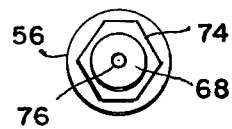
FIG. 6 is an end view of an end of an arm of the device of FIG. 4.

Referring now to FIG. 4, an alternative traction device 42 is essentially the same as traction device 2 with the exception of the ends of the arms. Device 42 is mounted on wheel 20, and has a flat base 44 bearing against wheel 20. Base 44 has openings 46 and 48 each receiving a lug 24 for the support of base 44. Base 44 has short arcuate bearing portions 52 and 54 adapted to be closely spaced adjacent lug nuts 26. Three equally spaced arms 56 are each connected to base 44 by an offset portion 58.

Figure 5:
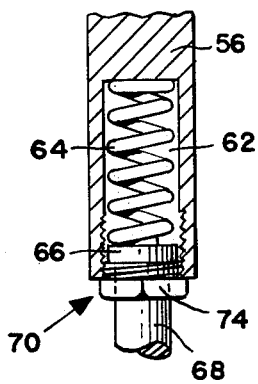
FIG. 5 is a view, partially broken away, showing the spring mounting for the end of an arm of the FIG. 4 traction device.

The end of each arm 56 has a bore 62 (FIG. 5) containing a compression coil spring 64 which biases the head 66 of a pin 68 outwardly against a threaded ring 70. Ring 70 has a hexagonal head 74 for turning it with a wrench into the threads of bore 62. Pin 68 has a pointed end 76 for penetration of the ice.

Spring 64 has a force just sufficient to keep pin 68 in its extended position when travelling over ice so that it penetrates the ice to provide traction. When tire 22 is rolling on a harder non-icy road surface, pin 68 moves inwardly against the force of spring 64 to retract point 76 to a position even with the outer periphery of tire 22.

Figure 7:
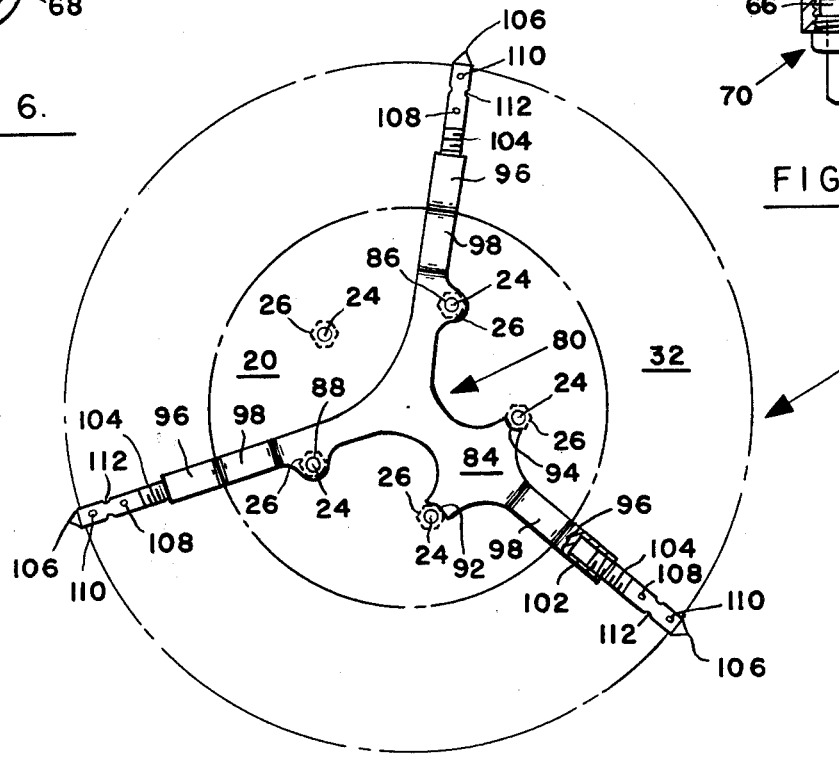
FIG. 7 is a side elevation of an alternative embodiment of the invention secured to a wheel.

Referring now to FIG. 7, a traction device 80 is shown mounted on wheel 20. The traction device 80 is essentially the same as traction device 42 with the exception of the structure at the outer ends of the arms. The device 80 has a base 84 with openings 86 and 88 for the reception of lugs 24, and short arcuate bearing portions 92 and 94 adapted to be closely spaced to adjacent lug nuts 26. Three equally spaced arms 96 are connected to base 84 by offset portion 98. Each arm 96 has a threaded bore 102 in its outer end in which is threaded a pin 104 having a pointed end 106. Pin 104 has parallel openings 108 and 110 and an opening 112 at 90° thereto for the reception of a pin to facilitate the turning of pin 104.

The structure of traction device 80 is advantageous since the position of extension of each pin 104 with relation to the outer periphery of tire 22 can readily be adjusted by turning pin 104. Further, pin 104 can be rotated sufficiently so as to withdraw into a storage position clear of the outer periphery of tire 22.

Adverting to FIG. 8, a traction device 120 is shown on drive wheel 20 on the driver's side of a vehicle. Device 120 has a flat base 122 provided with lug receiving openings 124, 126, 128 and 130. Three equally spaced arms 134 are connected to base 122 by an offset transition portion 136. Each arm 134 is associated with a pin 140 having a pointed end 142. Each pin 140 extends from a base 146 having a slot 148 receiving arm 134 to which base 146 is pivoted by a rivet 154. Back wall 156 of slot 148 is adapted to engage arm 134 when pin 140 is in the operative position to prevent the rotation of pin 140 out of position when the vehicle is moving forwardly. This arrangement permits pins 140 to be rotated out of the radial operative position inwardly into a storage position. The drive wheel on the passenger side of the vehicle will carry a device the same as device 120 but with the bases 146 reversed so as to resist pivoting due to the clockwise rotation of wheel 20 going forwardly. The drive 120 is advantageous for ambulances and police cars since it can stay on all winter.

Adverting to FIG. 10, a traction device 170 is shown mounted on a wheel 172 having mounted thereon a tire 174 with an outer side wall 176. Wheel 172 is mounted on lugs 178 provided with nuts 180. Device 170 has a base 182 having an opening 184 to accommodate an axle 186. Any of the previously described devices can have an opening to accommodate an axle where necessary. Base 182 has three openings 188 for the accommodation of lugs 178 and also has arcuate bearing portions 194 and 196 adapted to be closely spaced to adjacent lug nuts 180. Device 170 has five spaced arms 202 which are connected to base 182 by transition portions 204. Each arm 202 has a pointed end 206 which extends beyond the outer periphery of tire 174. The outer ends of arms 202 all lie in a vertical plane adjacent side wall 176 of tire 174.

When using a traction device of the invention, the vehicle engine should be warmed up first until the engine can be operated at slow idle. Then to move the vehicle on an icy surface, the vehicle should be started in low gear pressing lightly on the accelerator.

A traction device of the invention is normally used on each of two opposed drive wheels. In the case of a vehicle with a non-slip differential, the traction device may be used on one drive wheel.

It will be understood that the above described embodiments are illustrative and are not intended to be limiting.

I claim:

1. A traction device for use with a vehicle wheel supported by wheel lugs and having a tire comprising:
   a base having openings for the reception of at least two, but less than all, of the lugs for supporting the base so as to leave at least one lug supporting the wheel on its wheel base while mounting the base onto the wheel,
   spaced radial arms supported by the base and each having an end adapted to extend beyond the outer periphery of the tire and protrude into an icy surface,
   each of said ends adapted to lie in a substantially vertical plane adjacent the outer side wall of the tire.

2. The device of claim 1 in which the ends of the arms are mounted for free movement on the axis of the adjacent portion of the arm and a spring biases each end outwardly with just sufficient force for the end to protrude into ice.

3. The device of claim 1 in which the end of each arm is threadably attached to the arm for adjusting the distance it extends beyond the tire and to provide for the withdrawal of the end for out of use storage.

4. The device of claim 1 in which the end of each arm is pivotally connected to the arm for pivoting into and out of storage position, and means for releasably holding each end in position extending beyond the tire.

5. The device of claims 1, 2, 3 or 4 in which the base has a bearing portion thereof lying adjacent a nut on a lug which is not received in the lug openings.

6. The device of claims 1, 2, 3 or 4 in which the base has a bearing portion thereof lying adjacent a pair of adjacent nuts on lugs which are not received in the lug openings.

7. The device of claim 1 in which the end of each arm is threadably attached to the arm for adjusting the distance it extends beyond the tire and to provide for the withdrawal of the end for out of use storage and in which the base has a portion thereof lying adjacent a lug nut on a lug which is not received in one of said lug openings.

8. The device of claims 1, 2, 3 or 4 in which at least one of said ends is adapted to extend beyond the tire farther than the other ends.

9. The device of claims 1, 2, 3 or 4 having at least three arms.

10. The device of claims 1, 2, 3 or 4 having at least four arms.

11. The device of claims 1, 2, 3 or 4 having at least five arms.

12. A method of mounting the traction device of any of claims 1 to 4 onto a wheel, comprising the steps of
removing two or more but less than all of the lug nuts from the lugs,
leaving at least one lug nut undisturbed and supporting the wheel on its wheel base,
mounting the traction device on the lugs from which the nuts have been removed, and
replacing the nuts.

* * * * *